United States Patent [19]

Lindsey et al.

[11] Patent Number: 4,711,897

[45] Date of Patent: Dec. 8, 1987

[54] ANIMAL FEED METHODS AND COMPOSITIONS USING CYSTEAMINE

[75] Inventors: Thomas O. Lindsey, Coatesville, Pa.; Michael T. Zavy, El Reno, Okla.

[73] Assignee: SmithKline Beckman Corporation, Philadelphia, Pa.

[21] Appl. No.: 726,751

[22] Filed: Apr. 24, 1985

[51] Int. Cl.[4] .............................................. A23K 1/16
[52] U.S. Cl. .......................................... 514/665; 426/2
[58] Field of Search ...................... 426/2; 514/706, 665

[56] References Cited

U.S. PATENT DOCUMENTS 3,636,195  1/1972  Monson ............................... 514/665

FOREIGN PATENT DOCUMENTS 1105172  7/1984  U.S.S.R. .............................. 514/665

OTHER PUBLICATIONS

Millard et al., Science 217:452–454 (1982).
S. Sekoguchi et al., Poultry Science, 58 1213 (1979).
R. L. Sorenson et al., Diabetes, vol. 32, 377 (1983).
The Merck Index, Eighth Edition 1968 p. 317.

*Primary Examiner*—R. B. Penland
*Attorney, Agent, or Firm*—Janice E. Williams; Stuart R. Suter; Alan D. Lourie

[57] ABSTRACT

Cysteamine is used as an active ingredient in animal feed compositions and in methods for increasing the feed efficiency of immature, monogastric, meat-producing animals. A particularly useful active ingredient of this invention is cysteamine hydrochloride in a quantity selected from the range of 15–1200 ppm.

4 Claims, No Drawings

ANIMAL FEED METHODS AND COMPOSITIONS USING CYSTEAMINE

This invention comprises new animal feed compositions and methods using cysteamine as an active ingredient for improving the feed efficiency of immature or growing, monogastric, meat-producing animals.

BACKGROUND OF THE INVENTION

Cysteamine and its acid addition salts has been described to have various effects in rodents, including a depressing effect on somatostatin secretion. It has been used in anti-seborrheic preparations in humans.

As far as we are aware, the only description in the prior art of the use of cysteamine in monogastric animals is the application of the compound as the hydrochloride to mature chickens to increase meat tenderness by increasing intramuscular collagen, S. Sekoguchi et al., Poultry Science, 58 1213 (1979).

DESCRIPTION OF THE INVENTION

The cysteamine-supplemented animal feed compositions of this invention are fed to monogastric, immature, meat-producing animals, especially to swine or poultry. The result is an increase in the feed efficiency of the animals as described in greater detail below.

The active ingredient, cysteamine, has the following structural formula: $NH_2-CH_2-CH_2-SH$. It is usually used in the form of a pharmaceutically acceptable salt with a non-toxic acid such as hydrochloric, hydrobromic, sulfuric, phosphoric, sulfuric, methane sulfonic or ethane disulfonic acids. The compound and its salts are well known in the chemical literature. The preferred hydrochloride salt is available commercially.

The feed compositions of this invention comprise the normal feed rations of immature meat-producing animals which are supplemented by a quantity of cysteamine or a salt thereof, which is effective for improving the growth rate or feed efficiency of the animals but which is not toxic or noxious to a degree that the animals will reduce ingestion of the ration. It is known that cysteamine is very ulcerogenic upon oral ingestion, even causing death in a high percentage of the target animals. We have found that low doses of cysteamine increase feed efficiency and have a low toxicity profile.

Representative feed rations for swine and poultry are in the examples presented hereafter. Swine feed from weanling to fattening or finishing rations may be supplemented. Swine eat from about 0.9 kg per day (for a 11 kg pig) to 4 kg per day (for a 66 kg pig). Most rations are comprised of a corn base supplemented with a legume silage, wheat bran, oats, barley, molasses or a protein supplement.

Poultry feeds comprise starter rations, broiler rations and laying rations. The rations are usually based on ground corn, corn meal and soybean meal. The broiler rations also often contain high energy supplements such as added fats, proteins and vitamins. Turkey rations are similar, but comprise only a starting ration and a growing ration. Chickens or pheasants eat from 12–120 grams of feed per day, turkeys twice that much. Estimated intake of feed is dependent on the weight and age of the meat producing animal. Usually, corn-based feeds are most useful as carriers for the active ingredients of this invention.

Cysteamine, or an acid addition salt thereof, is mixed uniformly with the described feed rations to give a supplemented ration which is, then, fed as to custom. This is, most often, ad libitum. Conveniently, a premix of the supplemental growth promotant of this invention, which is optionally combined with or without other supplements known to this art such as an anthelmintic, a $H_2$-antagonist, a nitrogen source or an antibiotic such as virginiamycin or oxytetracycline, is prepared by the manufacturer for sale to the formulators or feed lot operators. The concentration of cysteamine in the premix is usually from up to 75% by weight or a concentration 100–2000 times greater than that in the complete feed ration. The premix form may be liquid or solid. Premix vehicles are corn oil, cottonseed oil, molasses or distillers solubles to form a liquid premix preparation. Sucrose, lactose, corn meal, ground corn, flour, calcium, carbonate or soybean meal are ofted used as bases for solid premix preparations. The premix composition is, then, mixed uniformly with whole ration which is commonly fed to the target animal. Such premix compositions are included in the term "feed compositions" as used herein.

The concentration of cysteamine content in the complete ration is a nontoxic but effective quantity chosen, for example, from a range of about 15–1200 parts of active ingredient by weight per million parts of whole feed (ppm). Advantageously, a quantity of the active ingredient is chosen from the range of 25–250 ppm of cysteamine base.

The method of this invention comprises feeding to growing, monogastric, meat-producing animals, especially swine and poultry, an effective growth-promoting but nontoxic quantity of cysteamine or an acid addition salt thereof. Other monogastric animals whose digestive tract features fermentation in a cecum or cecum-like chamber are rabbits and horses.

The supplemented feed rations described above are presented to the animal by method known to the art. Ad libitum feeding in the pasture, pen or growing shed is most convenient either to increase the growth rate of the animal or to increase the feed efficiency of the growing operation.

The chick studies presented in the demonstrative example below illustrate the biological spectrum of cysteamine hydrochloride as a feed additive to increase feed efficiency. At lower levels, from 25–250 ppm, a significant increase in weight of the growing chicks was observed. At higher levels of the operative range no weight increase over controls was observed but the chicks ate less feed to gain the same weight which effect is also an increase in the general feed efficiency of the animals.

The following working examples are intended to illustrate this invention.

EXAMPLE 1

A chicken ration for broilers is prepared using the following formula:

| | |
|---|---|
| Yellow corn meal | 67.35% |
| Soybean oil meal | 24.00% |
| Menhaden fish meal | 6.00% |
| Steamed bone meal | 1.00% |
| Ground limestone | 1.00% |
| Iodized salt | 0.34% |
| 25% choline chloride | 0.13% |
| Vitamin $B_{12}$ | 0.10% |
| Manganese sulfate | 0.02% |

| | |
|---|---|
| Vitamin mix | 0.06% |

The ration is supplemented with 25 ppm of cysteamine as the hydrochloride salt in a premix and is then fed ad libitum to the chicks.

EXAMPLE 2

A swine ration for growing hogs of 18-45 kilograms of body weight is prepared using the following formula:

| | |
|---|---|
| Corn, ground | 78.15% |
| Soybean oil meal, 44% | 17.0% |
| Meat scraps, 50% | 3.0% |
| Oyster shell flavor | 0.4% |
| Bone Meal | 0.5% |
| Zinc oxide | 0.1% |
| Vitamin A, B, $B_{12}$ and D supplement | optional |

The ration is supplemented to 100% with 500 ppm of cysteamine hydrochloride distributed through a standard premix carrier. The ration is fed, ad libitum, to the penned growing or fattening swine.

EXAMPLE 3

Chick Growth Studies

A. Methodology:

A replicate of 8 day old broiler chicks, selected for weight, health and sex, is housed in an environmentally controlled room with temperature at 37.7° and humidity at 40%. Chicks are fed ad libitum. Water is offered ad libitum. A corn basal ration is fed during the acclimation period (days 1 and 2), then, mixed with the compound under test or used as a control on days 3-17. Either 64 or 128 chicks are used for each test or control group.

| B. Dose Ranging Study - Cysteamine Hydrochloride | | | | | | | |
|---|---|---|---|---|---|---|---|
| Treatment | n[1] | Ulcer[2] Score | Weight Day 10 | Weight Day 17 | Feed/Gain 3-10 | 10-17 | Dead |
| Control | 31 | 1.903 | 162.8 g 100% | 369.5 g 100% | 1.469 100% | 1.5774 100% | 1 |
| 600 ppm | 32 | 2.406 | 159.9 98.2% | 357.6 96.8% | 1.485 101.1% | 1.6203 102.7% | 0 |
| 1200 ppm | 32 | 2.655 | 155.2 95.3% | 363.0 98.2% | 1.451 98.8% | 1.544 97.9% | 0 |
| 2400 ppm | 19 | 3.842 | 77.6 47.7% | 108.1 29.3% | 2.810 189.4% | 3.044 193% | 13 |

[1]number of chicks, usually in groups of 8 or less.
[2]maximum ulcer score = 4.

This study indicates a statistical difference in ulcerogenic activity of dosage levels used in the present invention compared with high levels of cysteamine. The lethal effect of cysteamine at the level of 2400 ppm is also demonstrated.

| C. Low Dose Study - Cysteamine Hydrochloride | | | | | | |
|---|---|---|---|---|---|---|
| Treatment | n | Weight Day 10 | Weight Day 17 | Feed/Gain 3-10 | 10-17 | Dead |
| Control | 64 | 208.2 g | 477.6 g | 1.270 g/g | 1.350 g/g | 1 |
| 25 ppm | 64 | 101.9% | 103.9% | 100.0% | 101.8% | 2 |
| 125 ppm | 64 | 101.5% | 102.5% | 98.3% | 101.0% | 2 |
| 250 ppm | 64 | 99.8% | 101.0% | 99.9% | 102.6% | 2 |

A statistical significant (p<0.05) weight gain was observed in chicks fed upon a corn diet supplemented with from 25-250 ppm of cysteamine hydrochloride.

| D. High Dose Study - Cysteamine Hydrochloride | | | | | | |
|---|---|---|---|---|---|---|
| Treatment | n | Weight Day 10 | Weight Day 17 | Feed/Gain 3-10 | 10-17 | Dead |
| Control | 64 | 189.0 g | 417.3 g | 1.421 g/g | 1.688 g/g | 2 |
| 1200 ppm | 64 | 98.8% | 99.7% | 94.7% | 94.8% | 0 |
| 1800 ppm | 64 | 83.6% | 82.4% | 97.8% | 93.7% | 4 |

Statistical analysis of these data:

| (1) CHICK WEIGHTS | | | |
|---|---|---|---|
| TREATMENT | DAY 3 | DAY 10 | DAY 17 |
| 0 | 61.32 | 189.01 | 417.32 |
| 1200 | 61.54 | 186.73 | 416.08 |

No significant differences detected between 0 and 1200 ppm of cysteamine.

| (2) CHICK WEIGHT GAIN | | |
|---|---|---|
| TREATMENT | DAYS 3-10 | DAYS 11-17 |
| 0 | 127.69 | 228.30 |
| 1200 | 126.19 | 229.35 |

No significant differences detected between 0 and 1200 ppm of cysteamine.

| (3) PEN INTAKE | | |
|---|---|---|
| TREATMENT | DAYS 3-10 | DAYS 11-17 |
| 0 | 181.35 | 385.40 |
| 1200 | 168.33[a] | 365.25[b] |

[a]$p < .006$, [b]$p < .068$

| (4) FEED TO GAIN RATIO | | | |
|---|---|---|---|
| TREATMENT | DAYS 3-10 | DAYS 11-17 | DAYS 3-17 |
| 0 | 1.4207 | 1.6887 | 1.5905 |
| 1200 | 1.3450[a] | 1.5946[b] | 1.5062[c] |

[a]$p < .030$, [b]$p < .020$, [c]$p < .015$

What is claimed is:

1. An animal feed composition comprising a whole animal feed ration or a premix and cysteamine as a supplement consisting essentially of said supplement in an amount effective for increasing the growth rate of an immature, meat producing, monogastric animal but which is not toxic to said animal, said amount being from about 25 to 250 ppm of cysteamine base.

2. The composition of claim 1 in which the supplement is cysteamine hydrochloride.

3. The composition of claim 1 in which the composition is a whole feed ration.

4. The composition of claim 1 in which the composition is a premix composition.

* * * * *